(12) United States Patent
Railing et al.

(10) Patent No.: US 8,024,504 B2
(45) Date of Patent: Sep. 20, 2011

(54) PROCESSOR INTERRUPT DETERMINATION

(75) Inventors: Brian P. Railing, Redmond, WA (US); Bruce L. Worthington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 63 days.

(21) Appl. No.: 12/147,455

(22) Filed: Jun. 26, 2008

(65) Prior Publication Data

US 2009/0327555 A1    Dec. 31, 2009

(51) Int. Cl.
G06F 13/24 (2006.01)
G06F 13/26 (2006.01)
G06F 13/32 (2006.01)
G06F 13/00 (2006.01)

(52) U.S. Cl. ......... 710/260; 710/264; 710/267; 719/321

(58) Field of Classification Search ............... 710/260, 710/264, 267; 719/321
See application file for complete search history.

(56) References Cited

U.S. PATENT DOCUMENTS

| | | |
|---|---|---|
| 4,959,781 A | 9/1990 | Rubinstein et al. |
| 5,043,882 A | 8/1991 | Ikeno |
| 5,179,707 A | 1/1993 | Piepho |
| 5,265,215 A | 11/1993 | Fukuda |
| 5,381,541 A | 1/1995 | Begun et al. |
| 5,428,799 A * | 6/1995 | Woods et al. ........... 710/266 |
| 5,446,910 A | 8/1995 | Kennedy |
| 5,515,538 A | 5/1996 | Kleiman |
| 5,568,644 A | 10/1996 | Nelson et al. |
| 5,630,141 A | 5/1997 | Ross et al. |
| 5,701,496 A * | 12/1997 | Nizar et al. ........... 710/266 |
| 5,815,733 A | 9/1998 | Anderson et al. |
| 5,862,366 A | 1/1999 | Schmidt |
| 5,918,057 A | 6/1999 | Chou |
| 5,944,809 A | 8/1999 | Olarig |
| 6,006,247 A | 12/1999 | Browning |
| 6,148,361 A | 11/2000 | Carpenter |
| 6,154,794 A | 11/2000 | Abdalla et al. |
| 6,195,676 B1 | 2/2001 | Spix |
| 6,237,058 B1 | 5/2001 | Nakagawa |
| 6,272,618 B1 | 8/2001 | Tyner et al. |
| 6,370,606 B1 | 4/2002 | Bonola |
| 6,484,220 B1 | 11/2002 | Alvarez, II et al. |

(Continued)

OTHER PUBLICATIONS

Larson, Douglas V., et al., "A Multiprocessor HP-UX operating system for HP 9000 computers—HP 9000 Model 870 workstation—includes related articles on future HP-UX systems—technical", http://findarticles.com/p/articles/mi0HPJ/isn6v43/ai13075715/p5.

(Continued)

Primary Examiner — Khanh Dang
Assistant Examiner — Christopher Daley (57) ABSTRACT

Processor interrupt determination procedures are described. In an implementation, one or more computer-readable media comprise instructions that are executable by a computer to determine, based on a performance goal, which of a plurality of processors is to be targeted by a device that is to perform an input/output operation when an interrupt message is discovered that is from the device and that targets the determined processor. The interrupt message is communicated to the device to indicate availability of the determined processor for use by the device. When an interrupt message is discovered that is from the device and that targets an alternative processor near the determined processor when compared with other processors in the plurality of processors, the interrupt message that targets the alternative processor is communicated to the device to indicate availability of the alternative processor for use by the device.

19 Claims, 5 Drawing Sheets

U.S. PATENT DOCUMENTS

| | | | |
|---|---|---|---|
| 6,618,779 B1 | 9/2003 | Branch | |
| 6,813,665 B2* | 11/2004 | Rankin et al. | 710/260 |
| 7,028,302 B2 | 4/2006 | Kiick | |
| 7,058,743 B2 | 6/2006 | Ostrovsky et al. | |
| 7,093,036 B2 | 8/2006 | Raghunath et al. | |
| 7,117,285 B2* | 10/2006 | Ota | 710/265 |
| 7,152,169 B2 | 12/2006 | Cooper et al. | |
| 7,191,349 B2* | 3/2007 | Kaushik et al. | 713/323 |
| 7,197,588 B2 | 3/2007 | Tsao | |
| 7,281,075 B2 | 10/2007 | Armstrong et al. | |
| 7,321,945 B2* | 1/2008 | Kataoka | 710/260 |
| 7,328,294 B2* | 2/2008 | Kim et al. | 710/260 |
| 7,350,006 B2* | 3/2008 | Yasue et al. | 710/264 |
| 7,363,411 B2 | 4/2008 | Kobayashi et al. | |
| 7,386,619 B1* | 6/2008 | Jacobson et al. | 709/229 |
| 7,433,985 B2 | 10/2008 | Ayyar et al. | |
| 7,493,435 B2 | 2/2009 | Kobayashi et al. | |
| 7,529,875 B2* | 5/2009 | Karamatas et al. | 710/260 |
| 7,543,306 B2* | 6/2009 | Gaur | 719/321 |
| 7,565,471 B2* | 7/2009 | Butler et al. | 710/260 |
| 7,610,425 B2 | 10/2009 | Solomita et al. | |
| 7,644,214 B2* | 1/2010 | Ohtsuka | 710/260 |
| 7,694,055 B2 | 4/2010 | Orita et al. | |
| 7,721,035 B2* | 5/2010 | Utsumi | 710/268 |
| 7,769,938 B2* | 8/2010 | Kaushik et al. | 710/268 |
| 7,783,811 B2 | 8/2010 | Worthington et al. | |
| 7,788,670 B2* | 8/2010 | Bodas et al. | 718/105 |
| 7,805,555 B2* | 9/2010 | Takata et al. | 710/260 |
| 2001/0052043 A1* | 12/2001 | Pawlowski et al. | 710/260 |
| 2002/0029358 A1 | 3/2002 | Pawlowski et al. | |
| 2003/0105798 A1* | 6/2003 | Kim et al. | 709/105 |
| 2004/0010667 A1* | 1/2004 | Brenner | 711/158 |
| 2004/0111593 A1 | 6/2004 | Arimilli | |
| 2004/0128563 A1* | 7/2004 | Kaushik et al. | 713/300 |
| 2005/0060460 A1* | 3/2005 | Karamatas et al. | 710/260 |
| 2005/0060462 A1 | 3/2005 | Ota | |
| 2006/0015668 A1* | 1/2006 | Nguyen et al. | 710/269 |
| 2006/0095624 A1* | 5/2006 | Raj et al. | 710/260 |
| 2006/0161921 A1 | 7/2006 | Kissell | |
| 2006/0179198 A1* | 8/2006 | Inoue et al. | 710/260 |
| 2007/0043970 A1 | 2/2007 | Solomita et al. | |
| 2007/0079039 A1* | 4/2007 | Raj | 710/260 |
| 2007/0088888 A1* | 4/2007 | Orita et al. | 710/260 |
| 2007/0157197 A1 | 7/2007 | Neiger | |
| 2007/0204087 A1 | 8/2007 | Birenbach | |
| 2007/0239917 A1* | 10/2007 | Orita et al. | 710/268 |
| 2008/0071947 A1 | 3/2008 | Fischer et al. | |
| 2009/0007150 A1* | 1/2009 | Li et al. | 719/321 |
| 2009/0157935 A1* | 6/2009 | Worthington et al. | 710/264 |
| 2009/0172228 A1* | 7/2009 | Zimmer et al. | 710/260 |
| 2009/0235004 A1* | 9/2009 | Dang et al. | 710/267 |
| 2009/0327556 A1 | 12/2009 | Railing | |

OTHER PUBLICATIONS

"How to Install and Use the Interrupt-Affinity Filter Tool", http://support.microsoft.com/kb/252867, 1-2.

"Intel Gigabit and 10 Gigabit Ethernet Controllers—Optimized for Multi-Core Intel Processor-Based Servers", http://www.intel.com/network/connectivity/resources/technologies/optimized_multicore.htm.

Eykholt, et al., "Beyone Multiprocessing..Multithreaning the SunOS Kernel", http://opensolaris.org/os/project/muskoka/docattic/beyondmp.pdf.

"Key Benefits of the I/O APIC", http://www.microsoft.com/whdc/archive/IO-APIC.mspx.

Hayashi, et al., "AIX 5L Practical Performance Tools and Tuning Guide", http://www.gstinc.com/products/ibm/bull/performance-tuning.pdf.

Plawner, Jordan et al., "Accelerating Application Traffic with Intel 10 Gigabit Ethernet Server Adapters", *Dell Power Solutions*, (Feb. 2008),pp. 92-95.

Gamarra, Al "MSI and MSI-X Deliver Performance Gains Through Emulex and Microsoft Partnership", *Emulex Corporation*, (Jul. 7, 2008),pp. 1-8.

"Non Final Office Action", U.S. Appl. No. 12/163,057, (Dec. 4, 2009),15 pages.

"Final Office Action", U.S. Appl. No. 12/163,057, (May 25, 2010),14 pages.

"Non-Final Office Action", U.S. Appl. No. 12/163,057, (Jun. 15, 2010),12 pages.

"Final Office Action", U.S. Appl. No. 12/163,057, (Aug. 6, 2010),13 pages.

"Non-Final Office Action", U.S. Appl. No. 12/163,057, (Nov. 3, 2010),17 pages.

"Final Office Action", U.S. Appl. No. 12/163,057, (Dec. 15, 2010), 19 pages.

* cited by examiner

PROCESSOR INTERRUPT DETERMINATION

BACKGROUND

Devices associated with a computer may target a processor with a message to communicate the processor information. For example, input/output device may signal the processor to inform the processor that an operation has been completed by the input/output device. However, such communication may become inefficient when the computer includes a multitude of processors, when processors are located in different physical localities and so on.

SUMMARY

Processor interrupt determination procedures are described. In an implementation, one or more computer-readable media comprise instructions that are executable by a computer to determine, based on a performance goal, which of a plurality of processors is to be targeted by a device that is to perform an input/output operation when an interrupt message is discovered that is from the device and that targets the determined processor. The interrupt message is communicated to the device to indicate availability of the determined processor for use by the device. When an interrupt message is discovered that is from the device and that targets an alternative processor near the determined processor when compared with other processors in the plurality of processors, the interrupt message that targets the alternative processor is communicated to the device to indicate availability of the alternative processor for use by the device.

In an implementation, a determination is made based on a performance goal as to which of a plurality of processors is to be targeted by a device that is to perform an input/output operation. When an interrupt message is discovered that is from the device and that targets the determined processor, the interrupt message is communicated to the device to indicate availability of the determined processor for use by the device.

In an implementation, a system comprises a plurality of processors communicatively coupled to a device to perform an input/output operation and a device driver to communicate to the device which of the plurality processors is to be targeted by an interrupt message from the device based on a performance goal. The interrupt message specifies an interrupt service routine for the device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "module," for instance, may refer to system(s), computer-readable instructions (e.g., one or more computer-readable storage media having executable instructions) and/or procedure(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Large scale computers may include numerous processors and devices for performing input/output operations. For example, an enterprise-level computer may include 64 processors physically arranged on several motherboards that are communicatively coupled to each other and to the devices via one or more buses. In some instances, the devices may target a processor with an interrupt message that lets the processor know some information. The amount of time associated with a device targeting a particular processor with the interrupt message and the particular processor handling the interrupt may depend on the location of the particular processor within the computer. In addition, an overall amount of processing resources used to complete handling the interrupt may vary depending on which processor is used to perform the interrupt. For example, more bus or other interconnect communications may be used when a first processor handles the interrupt in comparison to when a second processor is implemented to handle the interrupt.

A device may use an interrupt message to communicate information over the bus to one or more of the processors. For example, upon completing an input/output operation the device may issue an interrupt message that targets one of the processors to let the processor know that the device has completed the input/output operation. The interrupt message, for example, may include information about how the interrupt is to be targeted when the input/output operation is complete. In response, the targeted processor may handle or process an interrupt for the device.

While the device may be able to target each of the processors coupled by the bus, an overall time associated with a particular processor handling the interrupt may vary based on the physical location of that processor. For example, if the device targets a first processor that is physically near the device the interrupt may take less time than if the device targeted a second processor that is physically remote from the device in comparison to the first processor.

Techniques are described to determine which of a plurality of processors is to be targeted by a device. For example, a device driver is implemented to determine which of a plurality of processors the device is to target with an interrupt message. The determination may be made based on a performance goal. For example, based on a performance goal, an amount of time associated with targeting a first processor may be less in comparison to targeting a second processor with the interrupt message. In this manner, by intelligently selecting which processor is to receive the interrupt message, the overall system efficiency may be increased.

Upon determining which processor is to be targeted, a discovery may be made as to whether the device has an interrupt message that targets the determined processor.

When the device has the interrupt message, the interrupt message may be communicated to the device such that the device is informed of the availability of the determined processor to handle the interrupt. For example, the device driver may communicate the interrupt message to the device as a hint during input/output initiation.

In at least one implementation, the device driver determines which processor is to be targeted based on one or more performance goals. For example, the device driver's determination may be based on a performance goal, such as whether the processor initiated an input/output operation being performed by the device, whether the processor is idle and so on.

In at least one implementation, when an interrupt message targeting the determined processor is not discovered from the device, the device driver may discover whether the device has an interrupt message that targets a processor that is physically near to the determined processor. For example, if a device driver does not discover an interrupt message that targets the determined processor, the device driver may discover whether the device has an interrupt message that targets an alternative processor that is, for example, within a socket with the determined processor. In another example, the alternative processor is a processor with which the determined processor may rapidly communicate. For example, while a first processor may be physically near the determined processor in comparison to the alternative processor, the alternative processor may conduct communications with the determined processor faster than the first processor.

Techniques are described to select which of a plurality of processors is to further handle an interrupt. In one or more embodiments, a processor included in the plurality of processors selects which of the plurality of processors is to further handle the interrupt and notifies the selected processor. For example, the selected processor may handle the second level interrupt for the device after being alerted by the first processor, e.g., via inter-processor interrupts (IPIs).

When the selected processor is unavailable, the processor may continue to select which of the plurality of processors is to further handle the interrupt based on the one or more performance goals until an available processor is discovered. Further discussions of targeting a determined processor and further processing of an interrupt by a selected processor may be found in relation to FIGS. 1-5.

In the following discussion, an "Example Environment" is described that may employ techniques to determine which of a plurality of processors is to be targeted to handle an interrupt and selecting a processor to further handle the interrupt. "Example Procedures" are also described that may be employed in the example environments, as well as in other environments. Although systems and techniques are described as employed within a computing environment in the following discussion, it is to be readily apparent that these structures, modules, procedures and approaches may be incorporated within a variety of environments without departing from the spirit and scope thereof.

Example Environment

Figure 1:
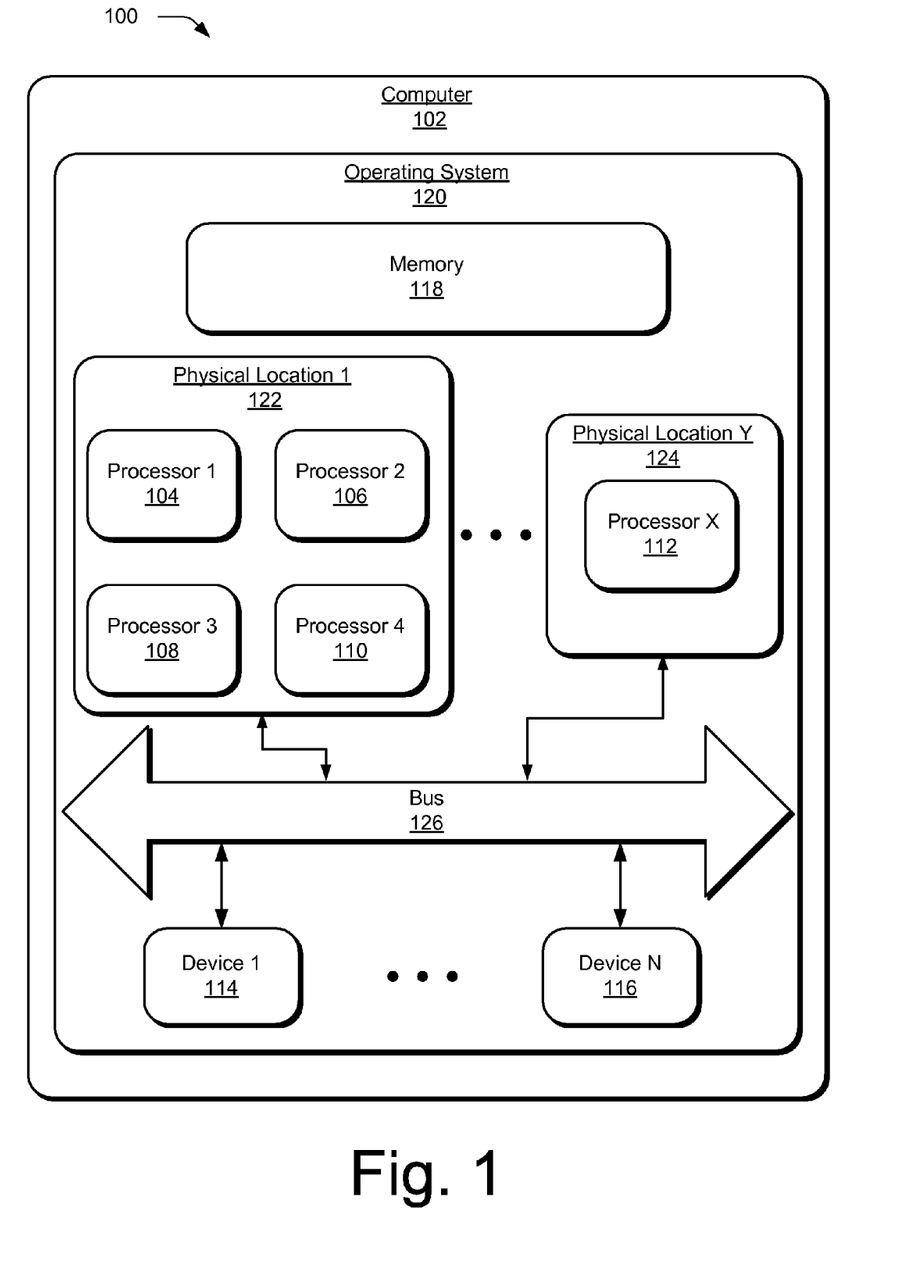
FIG. 1 is an illustration of an environment in which a determined processor may be targeted to handle an interrupt for a device that is to perform an input/output operation.

FIG. 1 is an illustration of an environment 100 in an example implementation that is operable to determine which of a plurality of processors is to be targeted by a device that is to perform an input/output operation. The environment 100 includes a computer 102 having the plurality of processors. For example, the computer 102 may be an enterprise level computer having 64 processors. The computer 102 is illustrated as including "1" through "X" processors (numbered 104-112), devices "1" through "N" (numbered 114 and 116, respectively) and memory 118.

The computer 102 is illustrated as executing an operating system 120 on one or more of the processors, e.g., processors "1" 104 through "X" 112. The operating system 120 may control the overall function of applications, programs and operations associated with the computer 102. The operating system 120 may, for example, provide a platform for an application to be executed without the application having to "know" how the computer 102 is configured, e.g., what type (s) of processors are include in the computer 102.

Additionally, although a single memory 118 is shown, a wide variety of types and combinations of memory may be employed, such as random access memory (RAM), hard disk memory, removable medium memory and other types of computer-readable media. Likewise, a variety of the devices, software and modules depicted in the environment 100 of FIG. 1 may also be representative of one or more devices, e.g., memory 118 may be representative of a plurality of memories.

Processors 104-112 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for the computer, may include, but are not limited to, quantum computing, optical computing, mechanical computing (e.g., using nanotechnology) and so forth.

The processors 104-112 may be physically arranged with respect to the other processors and devices within the computer 102. As illustrated, the computer 102 includes physical locations "1" 122 through "Y" 124. Physical locations may represent structures including one or more of the processors. For example, physical location "1" 122 may represent a multi-core, a socket, a non-uniform memory access (NUMA) node or a motherboard including processors "1" 104 through "4" 110. While physical locations "1" 122 through "Y" 124 are illustrated, the processors may be arranged in a variety of ways. Moreover, the processors can be communicatively coupled to the other processors included in the plurality of processors, the memory 118 and so on.

Devices "1" 114 through "N" 116 are each representative of functionality that may perform an input/output operation. For example, device 114 may be a hard drive that may store and/or retrieve data. For convenience, device "1" may be referred to as "the device" 114, e.g., the device that is to perform the input/output operation. Each of the devices may be communicatively coupled to the processors via a bus 126. In other instances, the device 114 may be communicatively coupled to a subset of the processors. In one or more embodiments, the bus 126 is a peripheral component interconnect (PCI) bus communicatively coupling the processors and the device 114. Other bus architectures and configurations may be used to permit communication between each of the devices and the processors.

In some embodiments, the devices are message signaled interrupt extended (MSI-X) compliant. MSI-X may permit the device 114 to provide information to the processors by issuing a message that is MSI-X compliant.

For example, the device 114 may issue an interrupt message to communicate information to the processor. Upon completing a store operation, for example, a hard drive device may issue an interrupt message to inform the processor that the hard drive device has finished storing data. Other interrupt messages may be available, examples of which include, link error, retry and so on. The device 114 may cause the processor to handle the interrupt by issuing an interrupt message that targets or is directed to the processor. For example, the device 114 may have interrupt messages that target processors 1, 5 and 32. In some instances, an interrupt message may target more than on processor, e.g., an interrupt message can target processors 1 and 3.

Upon receipt of the interrupt message, the processor targeted by the message may handle the device's interrupt service routine (ISR), e.g., a first level interrupt. (Unless otherwise understood from a context of a particular sentence or passage, for convenience, processor "2" 106 may also be referenced as "the processor" which may be an example of the processors within the plurality of processors to highlight particular embodiments. When "the processor" appears without an accompanying reference number, unless otherwise understood by the context of a particular sentence or passage, this is intended to highlight general aspects of "processors" included in the plurality of processors. The foregoing description is included to increase the reader's understanding of the subject matter discussed herein and is not limiting.) In some examples, the processor 106 targeted by the interrupt message may finish other higher priority processing activities (relative to the interrupt) before handling the interrupt.

As part of handling the first level interrupt, the processor 106 may select which processor is to further handle the interrupt (e.g., via a second level interrupt, an inter-processor interrupt (IPI) or software interrupt) associated with the first level interrupt for the device 114. Second level interrupts may be used to notify processors of high priority information, e.g., flush a table or to schedule a processor to handle a second level interrupt. Having briefly discussed the role of devices and interrupt messages, the role of a device driver will be described in determining which of a plurality of processors is to be targeted.

Figure 2:
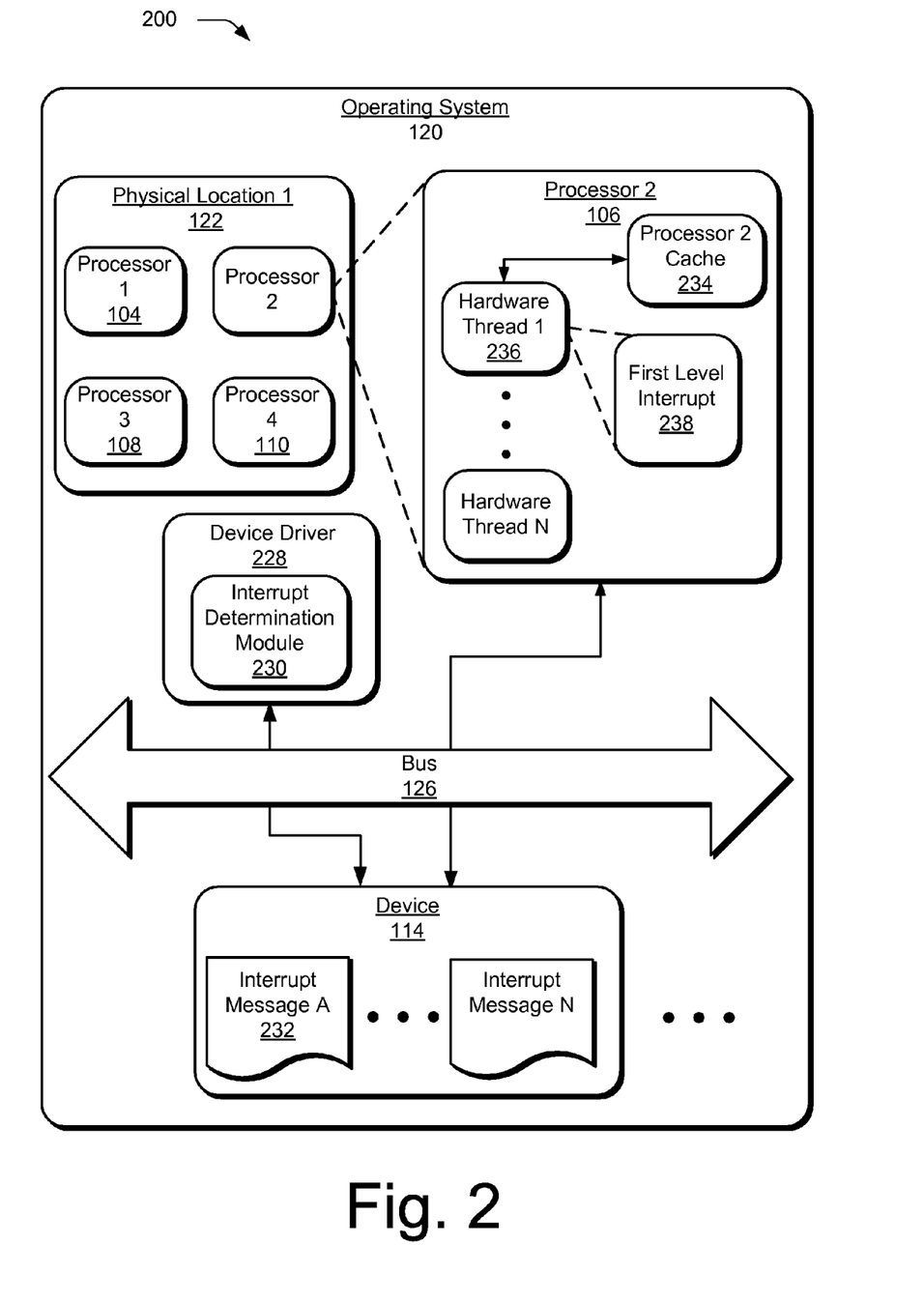
FIG. 2 is an illustration of a system in an example implementation in which a determined processor of FIG. 1 is illustrated as handling a first level interrupt.

As illustrated in FIG. 2, a system 200 includes in a device driver 228 to determine which of the plurality of processors the device 114 is to target such that the processor 106 (e.g., the targeted processor) handles the first level interrupt. For example, the device driver 228 may determine that the device 114 is to target processor "2" 106 based on one or more performance goals. Example performance goals may include, but are not limited to: designating a processor that initiated an input/output that is to be performed by the device 114, targeting an idle processor, designating a hardware thread that is scheduled to consume data from the input/output operation, designating a processor that is scheduled to process a software thread associated with the input/output operation at a point in time at which the device 114 is scheduled to issue an interrupt message, designating a processor near the device 114 and so on.

When making the determination, the device driver 228 may evaluate each processor or a subset of the plurality of processors with respect to a particular performance goal. For example, the device driver 228 may evaluate processors "1" 104 through "4" 110 by calculating how effectively each of the processors would fulfill the particular performance goal relative to the other processors.

For example, while processor "1" 104 through "4" 110 may be physically close to the device 114, the device driver 228 may determine that the device 114 is to target processor "2" 106 because processor "2" initiated the input/output operation associated with the interrupt. In this way, a performance goal may designate a particular processor to be targeted by the device 114 or an ordered list of processors based on the performance goal. In some examples, the performance goals are hierarchical such that one performance goal may predominate over other performance goals. For example, the device driver 228 may determine that the device 114 is to target an idle processor over a processor that is physically near the device 114 but is currently handling other work.

In another example, the device driver 228 may determine that the device 114 is to target processor "2" 106 because processor "2" is either idle or initiated the input/output operation that is to be performed by the device 114. Accordingly, an overall time associated with processor "2" 106 handling the interrupt may be less than a time associated with having another processor handle the interrupt. In this manner, the device driver 228 may minimize the overall time associated with the interrupt by determining which processor the device 114 is to issue the interrupt message. For example, by choosing a first processor that is near the device 114, the device driver 228 may reduce an overall time associated with the interrupt in comparison to second processor that is further away from the device 114 than the first processor.

The device driver 228 may make the determination on a per input/output basis. For example, while a first input/output operation is to target processor "4," the device 114 may target processor "2" 106 to receive an interrupt message for a second input/output operation. In further embodiments, the device driver 228 may first evaluate a set of performance goals and then down-select which of the performance goals is to serve as the basis for determining which processor is targeted. In other embodiments, the device driver 228 may weigh particular performance goals over other performance goals when determining which processor is to be targeted to handle the interrupt. In some implementations, the device driver may implement heuristic techniques when determining which processor is to be targeted.

In one or more embodiments, the device driver 228 may discover if the device 114 has a message that targets the determined processor. For example, discovery may include the device driver 228 requesting or being informed as to whether the device 114 has an interrupt message that targets the determined processor.

In other embodiments, the device driver 228 may discover which of the processors can be targeted by the device 114 (e.g., the device has an interrupt message that targets a particular processor) before determining which processor is to be targeted with the interrupt message. In this manner, the device driver 228 may determine which processor is to handle the interrupt from among the processors that can be targeted by the device 114.

In some embodiments, when more than one interrupt message targeting the processor 106 are discovered (e.g., the device 114 has more than one interrupt message for the processor 106), the device driver 228 may choose a lowest numbered interrupt message from among the interrupt messages targeting the processor 106. The lowest numbered interrupt message may be chosen because the processor 106 may handle a lower numbered interrupt message before handling a higher number interrupt message (relative to the lower numbered interrupt message). Therefore, an interrupt resulting from a lower numbered interrupt message may be handled by the processor 106 before an interrupt resulting from a higher numbered interrupt message.

In one or more embodiments, an interrupt determination module 230 is included in the device driver 228. For example, when a device lacks an interrupt message for the determined processor, the interrupt determination module 230 may discover whether the device 114 has a message that targets an alternative processor that is near to the determined processor. For example, if the device 114 lacks an interrupt message for the determined processor, the interrupt determination module 230 may discover whether the device 114 has an interrupt message for the alternative processor. The interrupt determination module 230 may choose the alternative processor for targeting such that the alternative processor handles the interrupt. The interrupt determination module 230 may continue to discover alternative processors until an available processor is discovered.

In some embodiments, the interrupt determination module 230 uses criterion to choose which processor near the determined processor is to handle the interrupt. Example criterion include, but are not limited to, a locality of a processor, is a processor running, a particular workload running on a processor and so on. For example, the interrupt determination module 230 may choose to discover an idle processor over an active processor, when the idle processor and active processor are both physically near the determined processor.

When the interrupt message is discovered from the device 114 for the particular processor (e.g., the determined processor or the alternative processor when the device 114 lacks an interrupt message targeting the determined processor), the device driver 228 may communicate the interrupt message to the device 114. For example, the device driver 228 may communicate the interrupt message as a hint to the device 114 during input/output initiation. Thus, the device driver 228 may indicate that the determined processor is available for use, e.g., to handle the interrupt. In a similar manner, when an interrupt message that targets the determined processor is not discovered but an interrupt message associated with an alternative processor is discovered, the device driver 228 may communicate the interrupt message for the alternative processor to the device 114.

For example, in response to the device driver 228 communicating the discovered interrupt message (targeting processor "2" 106) to the device 114, the device may issue interrupt message "A" 232 to inform processor "2" 106 that the input/output operation is finished. In this case, the device 114 may target processor "2" 106 because processor "2" initiated the input/output operation associated with the interrupt. The device 114 may choose to target this processor because in some instances the processor cache (e.g., cache 234) may contain data associated with the interrupt. Hardware thread "1" 236, for example, may handle the first level interrupt 238 for the device 114, e.g., execute the interrupt service routine for the device 114 upon receiving interrupt message "A" 232. Having described the device driver 228 as determining which of the plurality of processors is to be targeted and communication of the interrupt message, the processor's handling of the interrupt and further interrupt handling will be described.

Figure 3:
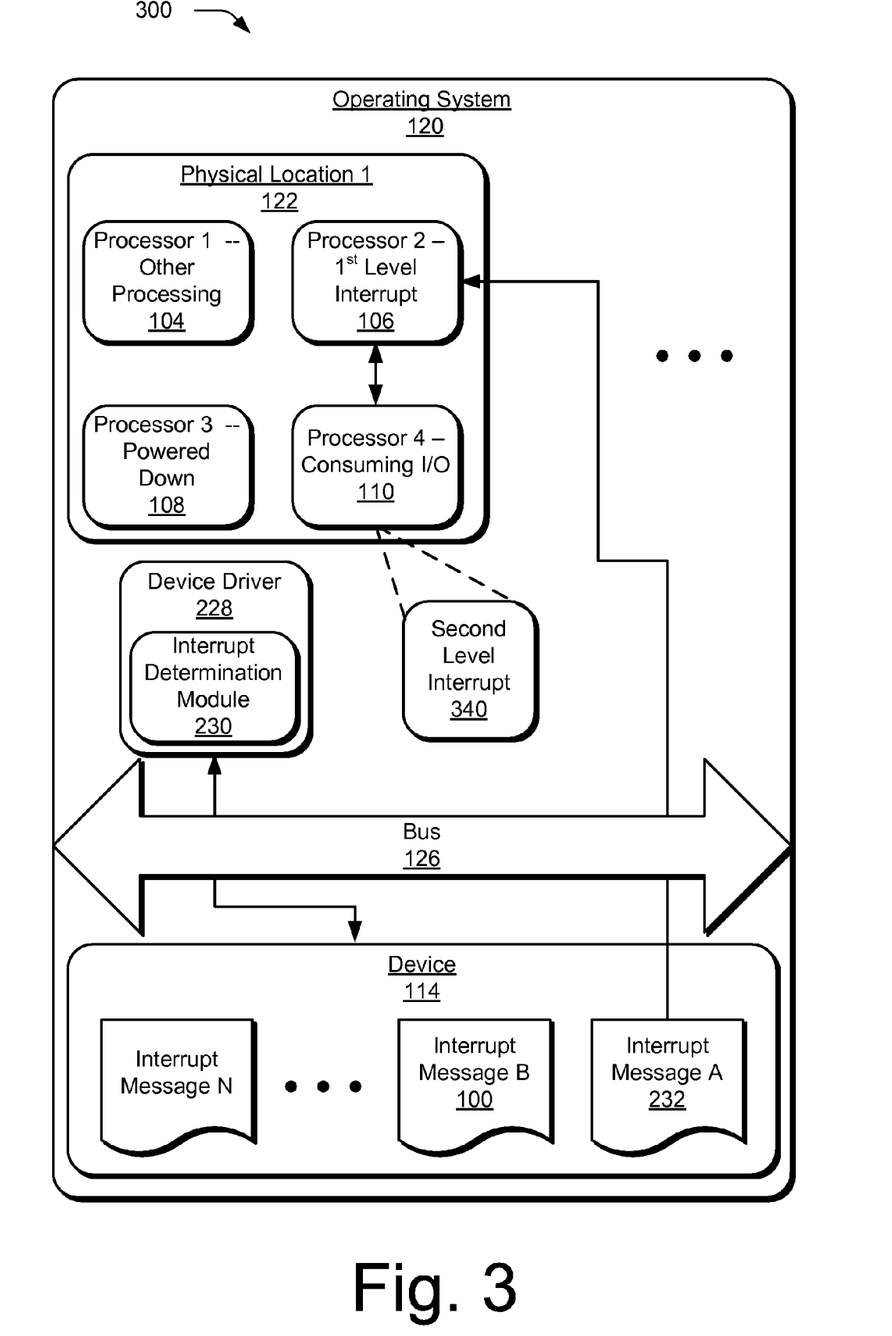
FIG. 3 is an illustration of an example implementation in which a determined processor of FIG. 1 is illustrated as selecting which of a plurality of processors is to handle a second level interrupt.

Referring to FIG. 3, a system 300 including a processor handling the first level interrupt (e.g., processor "2" or "the processor" 106) may select which of the plurality of processors is to further handle the interrupt. For example, the processor 106 may select which of the plurality of processors is to handle a software interrupt or second level interrupt 340 for the device, e.g., processor "4" 110.

The processor 106 may select which of the plurality of processors is to further handle the interrupt based on one or more performance goals. For example, the performance goals implemented by the device driver 228 may be implemented to select which processor is to handle the second level interrupt. Example performance goals may include, but are not limited to: designating a processor that initiated an input/output operation, targeting an idle processor, designating a hardware thread that is scheduled to consume data from an input/output operation, targeting a processor that is scheduled to process a software thread associated with an input/output operation at a point in time at which the device 114 is to issue an interrupt message, designating a processor near a processor handling a first level interrupt, designating a processor near the device 114 and so on.

A particular performance goal considered by the processor 106 may vary from a performance goal evaluated by the device driver 228. In some embodiments, one or more particular performance goals may impact processor selection more than another performance goal. For example, while an "idle performance goal" may be considered when determining which processor is to handle the first level interrupt, a processor's locality may be considered when selecting a processor to further process the interrupt.

In some other embodiments, the processor 106 may select a processor by evaluating a group of performance goals and then down-selecting from the group. The evaluation may be performed on a per input/output operation basis. For example, the processor 106 may initially evaluate performance goals such as whether a processor that is being considered is near the device 114, whether a processor being considered is idle, or whether a hardware thread is scheduled to consume data from the input/output operation. In a subsequent evaluation, the processor 106 may base processor selection on the "idle performance goal" as this performance goal may impact an overall time for the interrupt in comparison to the performance goals considered in the initial evaluation.

In some embodiments, the processor 106 may implement heuristic techniques during processor selection. For example, when determining which processor is to be selected, the processor 106 may heuristically evaluate the one or more performance goals and/or processors according to the input/output operation associated with the interrupt.

In one or more embodiments, the processor 106 may select the processor being considered from a prioritized list according to the performance goal. For example, each processor in the plurality of processors may be prioritized based on the performance goal. The processor 106 may then select a highest prioritized processor, e.g., processor "4" 110 to further handle the interrupt.

The processor 106 may check on a processor's availability. For example, the processor 106 may check on whether a processor being considered (e.g., processor "4" 110) is currently handling other interrupts, whether the processor is powered down and so on.

When the selected processor is not available, the processor 106 may repeat selecting processors based on the prioritized list until a processor is discovered that is available. For example, as part of evaluating which of the plurality of processors is to be selected, processor "2" 106 may evaluate the suitability of each processors handling the second level interrupt. In this case, processor "2" 106 may select processor "4" 110 to handle the second level interrupt 340 (e.g., acts as second level interrupt handler) because processor "1" 104 is handling (relatively) higher priority processing and processor "3" 108 is powered down (e.g., in a low power state compared to when processor "3" 108 is actively processing data). When evaluating processors for selection, the processor 106 may select itself (the processor handling the first level interrupt or processor "2") to handle the second level interrupt.

The components, modules, functions and techniques discussed above may be implemented singly or in combination based on design preference. Generally, any of the modules and functions described herein can be implemented using software, firmware, hardware (e.g., fixed logic circuitry), manual processing, or a combination of these implementations. The terms "module," "functionality," and "logic" as used herein generally represent software, firmware, hardware or a combination thereof. Additionally, functions can be embodied as executable instructions that are included in one or more computer-readable storage media. The features of the procedures described below are platform-independent, meaning that the procedures may be implemented on a variety of platforms having a variety of processors and memory.

Example Procedures

The following discussion describes transformation procedures that may be implemented utilizing the previously described structures, modules, approaches and procedures. Aspects of the modules may be implemented in hardware, firmware, software, or a combination thereof. The procedures are shown as a set of blocks that specify operations performed by one or more devices and are not necessarily limited to the orders shown for performing the operations by the respective blocks.

Figure 4:
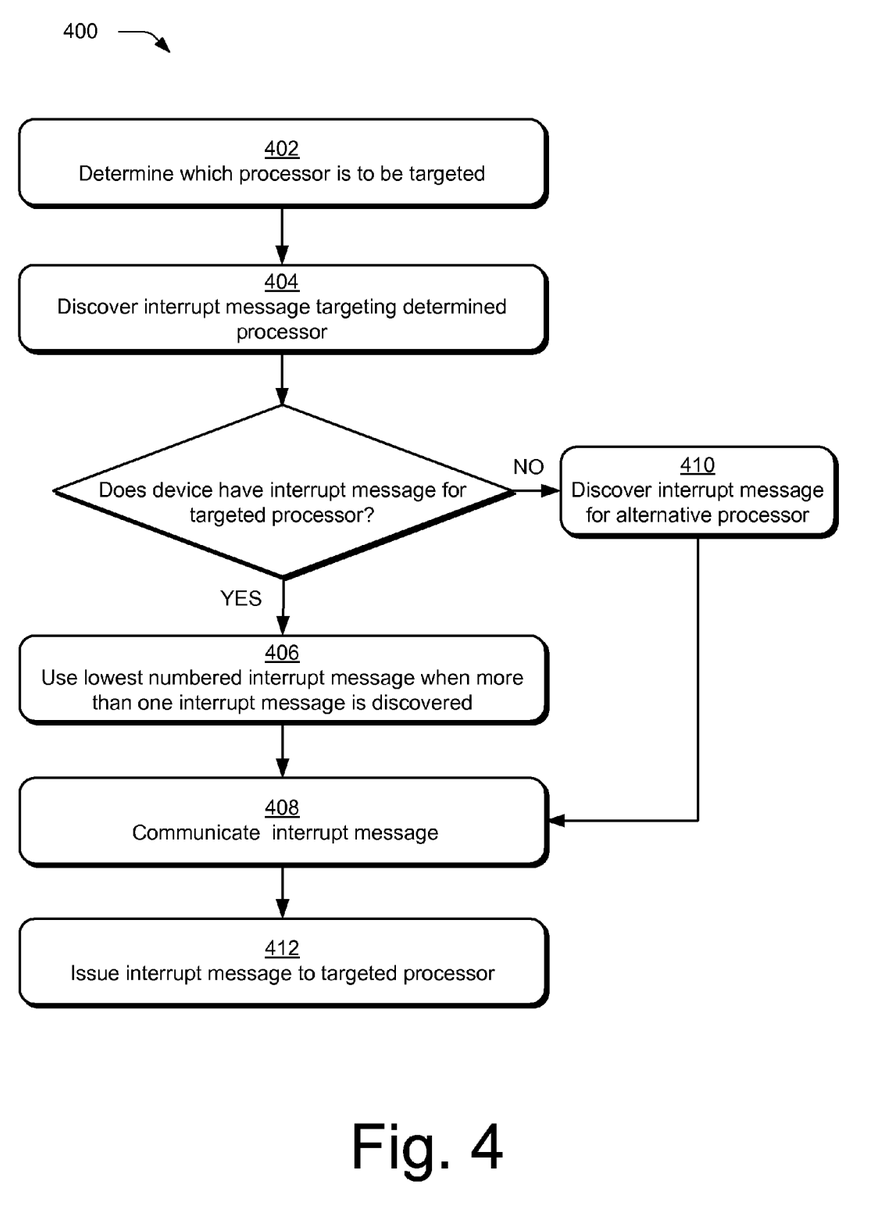
FIG. 4 is a flow diagram depicting a procedure for determining which of a plurality of processors is to be targeted by a device.

FIG. 4 depicts a procedure 400 in an example implementation in which procedures are described to determine which of a plurality of processors is to be targeted to handle a first level interrupt or hardware interrupt for a device to perform an input/output operation.

A determination is made as to which of a plurality of processors is to be targeted to handle an interrupt for a device that is to perform an input/output operation (block 402). The determination may be based on one or more performance goals. For example, the device driver 228 may determine that a particular processor is to be targeted based on whether the particular processor initiated the input/output operation, whether the particular processor is idle, whether the particular processor includes a hardware thread consuming data from the input/output operation, whether the particular processor is to process a software thread for the input/output operation, whether the particular processor is near the device 114 and so on.

In one or more embodiments, the determination may include a weighted evaluation of the performance goal and/or may include a down-select evaluation of the performance goals. For example, the device driver 228 may initially evaluate which performance goals may be weighted more than the other performance goals being evaluated. The relative importance of a particular performance goal may vary depending on the input/output operation. For example, while locality may be considered for a first interrupt, locality may not be considered to the same degree when handling a second interrupt.

An interrupt message is discovered from the device 114 that is to perform the input/output operation (block 404). For example, the device driver 228 may discover whether the device 114 has an interrupt message that targets the determined processor. In one or more embodiments, when multiple interrupt messages are discovered (block 406), the lowest numbered interrupt message may be communicated (block 408). When an interrupt message for the determined processor is discovered, the interrupt message may be communicated to the device (block 408). For example, the device 114 may use the interrupt message to indicate the availability of the determined processor for use by the device to handle the interrupt.

In one or more embodiments, the determined processor may be chosen from among a plurality of processors that are targeted by interrupt messages discovered from the device 114. In this way, the determination may be made among the processor that can be targeted by the device's interrupt messages.

When an interrupt message is not discovered (e.g., the device 114 does not have an interrupt message), an interrupt message targeting an alternative processor near the determined processor may be discovered (block 410) and communicated to the device (block 408). For example, the interrupt message targeting the alternative processor may be communicated during input/output initiation to indicate the availability of the alternative processor, e.g., the alternative processor is idle. Discovering which processor that is near the determined processor is to be targeted may be based on the performance goal and/or different criterion.

The interrupt message may be issued to the targeted processor to inform the targeted processor of some information (block 412), such as input/output operation failure, retry and so on. For example, the device 114 may send the interrupt message to the determined processor that in response handles or processes the first level interrupt, e.g., the service interrupt routine for the device 114. Having described determining which of a plurality of processors is to be targeted to handle an interrupt for the input/output operation, further handling of the interrupt is now discussed. While the below procedures are described with reference to the procedure described and illustrated in FIG. 4, in one or more embodiments each of procedures may be used independently.

Figure 5:
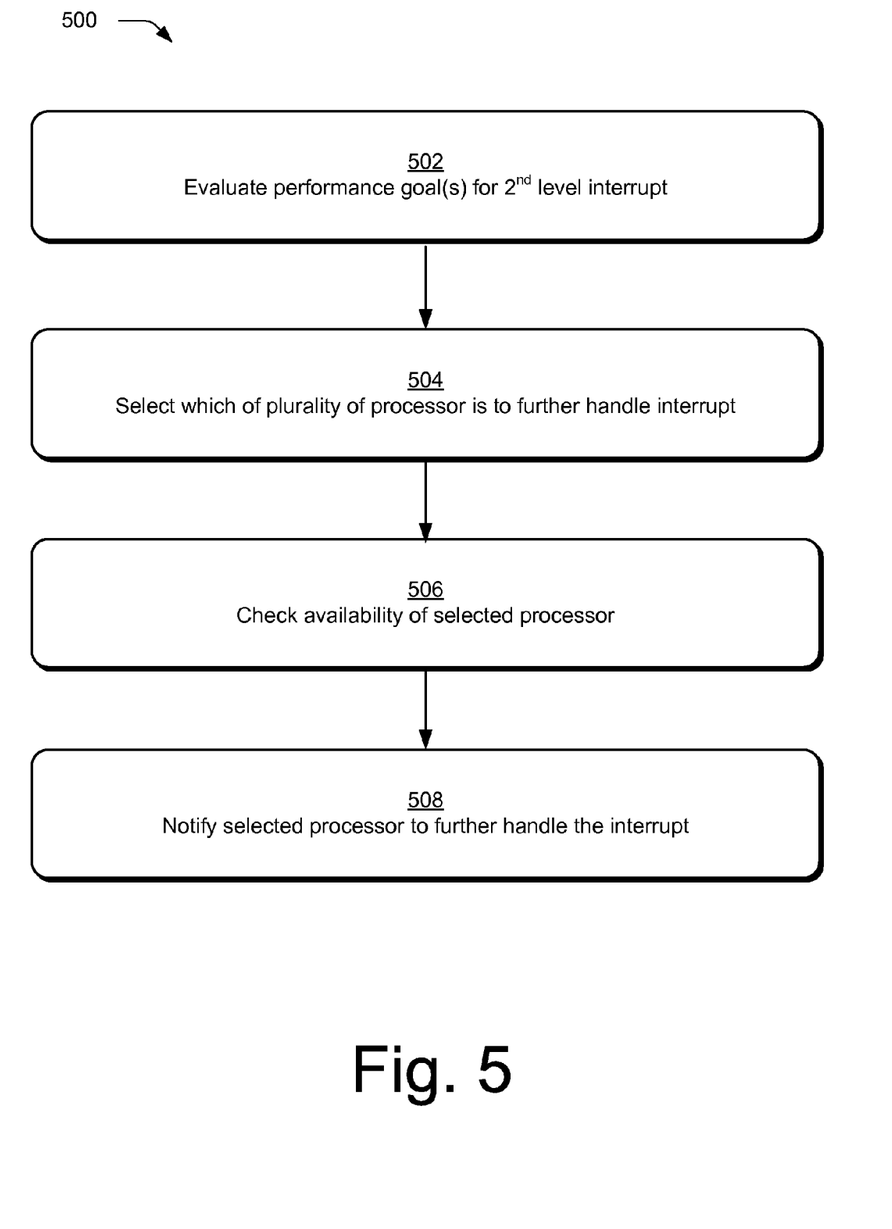
FIG. 5 is a flow diagram depicting a procedure for selecting which of a plurality of processors is to further handle an interrupt.

FIG. 5 depicts a procedure 500 in an example implementation in which procedures are described to select which of a plurality of processors is to further handle an interrupt. For example, while a first processor may handle the first level interrupt, the first processor may select which of the plurality of processors is to handle the second level interrupt for the device 114.

In one or more embodiments, one or more performance goals are evaluated (block 502) on a per input/output operation basis to choose which performance goals are to serve as a basis for selecting a processor to further handle an interrupt. The performance goals may be evaluated as each performance goal's impact on an overall time associated with the interrupt may vary according to an input/output operation associated with the interrupt. For example, while a first performance goal may predominate for an interrupt associated with a first input/output operation, the impact of meeting the first performance goal may be less of a consideration for a second input/output operation in comparison to the first input/output operation.

In some embodiments, the evaluation procedure may include a weighted evaluation or a down-select evaluation. A down-select evaluation may include evaluating an initial group of performance goals and then evaluating a subset of the initial group of performance goals. In one or more embodiments, the evaluation implements heuristic techniques as part of the weighted evaluation or the down-select evaluation. The subset of performance goals may be used as a basis for selecting which of the plurality of processors is to further handle the interrupt.

The selection is made as to which of a plurality of processors is to further handle the interrupt (block 504). The selection may be based on the performance goals. In embodiments, the selected processor may be a processor that may minimize an overall time associated with further handling the interrupt in comparison to other processors included in the plurality of processors.

In one or more embodiments, the processor that is to further handle the interrupt may be selected from a prioritized list according to the performance goals. For example, individual processors in the plurality of processors may be prioritized based on the performance goals, with a highest prioritized processor of the plurality of processors being selected to further handle the interrupt.

The selected processor's availability may be checked (block 506). For example, the processor handling the first level interrupt may check whether the selected processor is available for handling the second level interrupt for the device 114. The selected processor may not be available because the selected processor is powered down, is handling other interrupts and so on. When the selected processor is not available, selection may continue until a processor that is available is discovered. For example, the processor handling the first level interrupt may select a second highest prioritized processor from the list when the highest prioritized processor is unavailable.

In one or more embodiments, checking processor availability may occur before processor selection such that selection occurs from processors discovered to be available. For example, the processor handling the first level interrupt may check on the availability of individual processors in the plurality of processors and then select, based the performance goals being considered, which of the available processors is to further handle the interrupt.

The selected processor may be notified by the processor handling the first level interrupt to further handle the interrupt (block 508). For example, the selected processor may be notified to handle the second level interrupt, e.g., via an inter-processor interrupt.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

discovering, with a device driver associated with a device that is to perform an input/output operation, from an interrupt message received from the device which of a plurality of processors are targeted by the device's interrupt messages;

determining, based on a performance goal, which of the plurality of processors the device is to target with the interrupt message, wherein determining is performed on a per input/per output operation basis, wherein the performance goal is selected based, at least in part, on the input/output operation of the device, the performance goal being a different performance goal than one selected for a previous input/output, the determined processor selected as a highest prioritized processor from a prioritized list according to the performance goal;

checking availability of the determined processor;

if a determined processor is not available, selecting a second highest prioritized processor from the prioritized list as the determined processor; and communicating the discovered interrupt message that was received from the device back to the device to indicate availability of the determined processor for use by the device when the discovered interrupt message targets the determined processor.

2. The method of claim 1, wherein the performance goal designates one or more of:

a particular said processor that initiated the input/output operation;

an idle said processor;

a hardware thread consuming data from the input/output operation;

a particular said processor that is scheduled to be running a processing thread for the input/output operation when an interrupt is scheduled to issue; or a particular said processor near the device when compared with other processors in the plurality of processors.

3. The method of claim 1, further comprising when no interrupt message is discovered that is from the device and targets the determined processor, and when an interrupt message is discovered that is from the device and that targets an alternative processor near the determined processor when compared with other processors in the plurality of processors, communicating the interrupt message that targets the alternative processor to the device to indicate availability of the alternative processor for use by the device.

4. The method of claim 3, wherein the alternative processor is one or more of:

on a motherboard with the determined processor;

included in a non-uniform memory access node with the determined processor;

in a common socket with the determined processor; or makes use of a common bus with the determined processor.

5. The method of claim 1, wherein the determined processor is configured to handle a hardware interrupt for the device.

6. The method of claim 1, wherein the discovered interrupt message is message signaled interrupt extended (MSI-X) compliant.

7. The method of claim 1, wherein communicating occurs during input/output initiation.

8. The method of claim 1, further comprising when more than one interrupt message that target the determined processor are discovered from the device, choosing said interrupt message having a lowest number for communication to the device.

9. A system comprising:

a plurality of processors communicatively coupled to a device to perform an input/output operation; and a device driver to communicate to the device which of the plurality of processors is to be targeted by an interrupt message from the device based on a performance goal, the interrupt message specifying an interrupt service routine for the device, wherein the performance goal may be changed on a per input/per output basis and be evaluated on a per input/per out basis by both a processor that handled a previous interrupt message associated with the interrupt message and by the device driver, wherein the device driver is configured to:

evaluate the performance goal by performing a weighted evaluation on a plurality of performance goals, wherein weight is based, at least in part, on the input/output operation of the device;

determine, based on the performance goal, which of a plurality of processors is to be targeted by the device that is to perform the input/output operation, the processor selected as a highest prioritized processor from a prioritized list according to the performance goal;

check availability of the determined processor; and if a determined processor is not available, select a second highest prioritized processor from the prioritized list as the determined processor.

10. The system of claim 9, wherein the performance goal designates one or more of:

a particular said processor that initiated an input/output operation;

an idle said processor;

a hardware thread consuming data from the input/output operation;

a particular said processor that is scheduled to be running a processing thread for the input/output operation when an interrupt is scheduled to issue; or a particular said processor near the device when compared with other processors in the plurality of processors.

11. The system of claim 9, wherein the device driver is further configured to when an interrupt message is not discovered that is from the device and targets a determined processor which to be targeted by an interrupt message, discover an interrupt message that is from the device and targets an alternative processor near the determined processor when compared with other processors in the plurality of processors, communicate the interrupt message that targets the alternative processor to the device to indicate availability of the alternative processor for use by the device.

12. The system of claim 11, wherein the alternative processor is one or more of:
   on a motherboard with the determined processor;
   included in a non-uniform memory access node with the determined processor;
   in a common socket with the determined processor; or
   makes use of a common bus with the determined processor.

13. The system of claim 9, wherein the interrupt message is message signaled interrupt extended (MSI-X) compliant.

14. One or more computer-readable media comprising instructions that are executable by a computer to:
   select a performance goal by performing a weighted evaluation on a plurality of performance goals, wherein weight is based, at least in part, on whether an input/output operation of a device comprises either a first level interrupt or a second level interrupt;
   determine, based on the performance goal, which of a plurality of processors is to be targeted by the device that is to perform the input/output operation, the processor selected as a highest prioritized processor from a prioritized list according to the performance goal;
   check availability of the determined processor;
   if a determined processor is not available, select a second highest prioritized processor from the prioritized list as the determined processor;
   discover whether the device has an interrupt message that targets the determined processor;
   when an interrupt message is discovered that targets the determined processor, communicate the discovered interrupt message to the device to indicate availability of the determined processor for use by the device;
   when an interrupt message is discovered that is from the device and that targets an alternative processor near the determined processor when compared with other processors in the plurality of processors, communicate the discovered interrupt message that targets the alternative processor to the device to indicate availability of the alternative processor for use by the device; and
   when more than one interrupt message that targets the determined processor are discovered from the device, choose the discovered interrupt message having a lowest number for communication to the device to indicate availability of the determined processor for use by the device.

15. One or more computer-readable media as described in claim 14, wherein the performance goal designates one or more of:
   a particular said processor that initiated the input/output operation;
   an idle said processor;
   a hardware thread consuming data from the input/output operation;
   a particular said processor that is scheduled to be running a processing thread for the input/output operation when an interrupt is scheduled to issue; or
   a particular said processor near the device when compared with other processors in the plurality of processors.

16. One or more computer-readable media as described in claim 14, wherein the alternative processor is one or more of:
   on a motherboard with the determined processor;
   included in a non-uniform memory access node with the determined processor;
   in a common socket with the determined processor; or
   makes use of a common bus with the determined processor.

17. One or more computer-readable media as described in claim 14, wherein the interrupt message is message signaled interrupt extended (MSI-X) compliant.

18. One or more computer-readable media as described in claim 14, wherein the device is communicatively coupled by a peripheral component interconnect bus.

19. One or more computer-readable media as described in claim 14, wherein communicating occurs during input/output initiation.

* * * * *